Nov. 22, 1932.  A. B. LEWIS  1,888,928
DOUGHNUT COOKING DEVICE
Filed Feb. 14, 1931
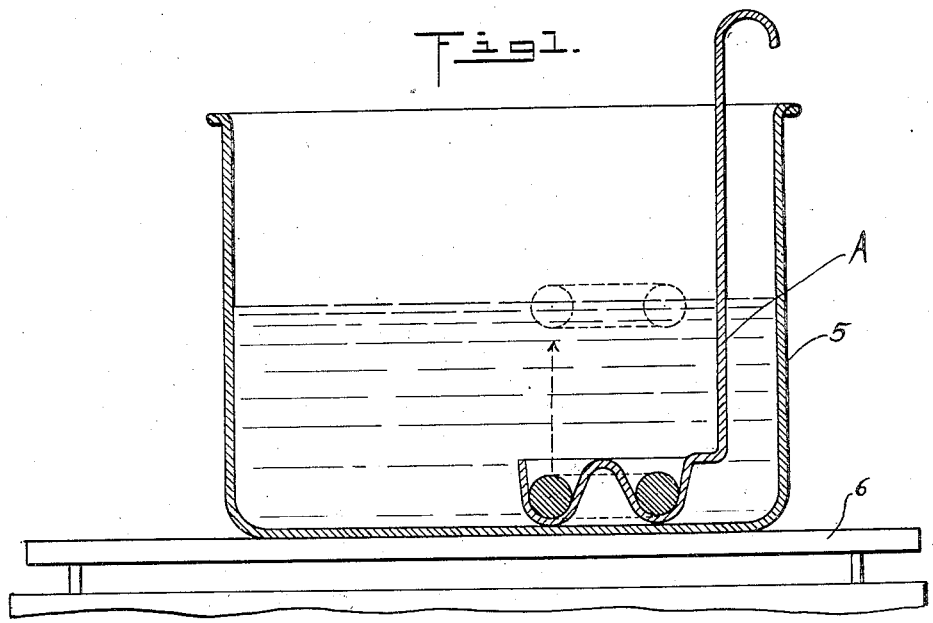
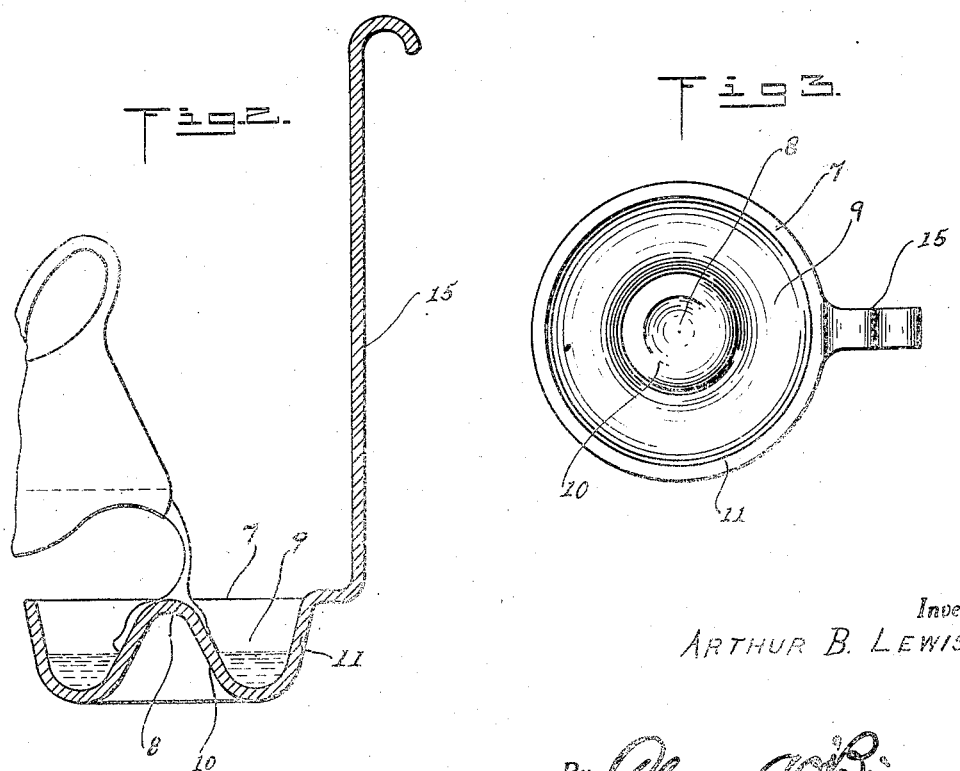
Inventor
ARTHUR B. LEWIS Patented Nov. 22, 1932

1,888,928

UNITED STATES PATENT OFFICE

ARTHUR B. LEWIS, OF CLAREMONT, NEW HAMPSHIRE

DOUGHNUT COOKING DEVICE

Application filed February 14, 1931. Serial No. 515,862.

The present invention relates to new and useful improvements in the art of cooking, and more particularly it pertains to a new and novel means and method of cooking such pastries as doughnuts.

It is one of the objects of the present invention to provide means for cooking doughnuts whereby the formation of dough, rolling the dough and subsequently cutting it into the desired shape to be cooked are eliminated.

It is a further object of the invention to provide a device of the aforementioned character which will preliminarily shape or form a relatively thin batter into the desired form, will provide the means for introducing the so formed batter into the cooking medium, and subsequently release the same to the action of the cooking medium.

It is a further object of the invention to provide a device of the aforementioned character in which pastry articles such as doughnuts of various sizes may be formed without in any manner altering the device.

A still further object of the invention resides in the provision of a device of the aforementioned character which is highly efficient in operation, and may be manufactured at a relatively low cost.

With the above and other objects in view, reference will be had to the accompanying drawing, wherein;

Figure 1 is a vertical sectional view of a cooking receptacle showing the manner in which a device constructed in accordance with the present invention is used, the device of this invention being shown in sectional form, Figure 2 is a detail vertical sectional view of a device constructed in accordance with the present invention showing the manner in which the material to be cooked is introduced into the device, and;

Figure 3 is a top plan view of a device constructed in accordance with the present invention.

Referring again to the drawing, and particularly to Figure 1, the reference numeral 5 designates a cooking receptacle of any desired type, and in said figure the receptacle is shown as supported upon a stove or other heating element 6.

The device constructed in accordance with this invention is designated A, and it consists of a receptacle like member 7. The receptacle member 7 has a centrally disposed upwardly projecting portion 8 which forms a continuous channel 9. The side walls 10 and 11 of this channel 9 are flared outwardly in order to provide a channel of varying width and thus provide for the manufacture of pastry elements of various sizes.

Projecting vertically from the receptacle like member 7, there is a relatively thin narrow member 15 which forms an operating or manipulating handle for the device.

In operation, batter such as designated in Figure 2 is poured into the receptacle like member 7 and occupies a position in the channel 9 thereof. After this has been done, the device is inserted into the cooking medium which is preferably in the form of hot grease or fat within the cooking utensil 5 and immediately the device is submerged in the fat, the pastry rises to the surface as illustrated in dotted lines in Figure 1.

It is well known that in the cooking of doughnuts by the generally accepted process, the material from which the doughnut is formed is in the nature of a dough which is rolled out and the doughnuts are cut therefrom.

By the use of this device, however, the doughnuts are not formed from dough but from a relatively thin batter which may be poured into the receptacle like member 7 from a pitcher or similar receptacle thus eliminating the working of the dough to a relatively stiff consistency, rolling the same out and cutting the doughnut elements therefrom.

It is to be understood that through the medium of the constant submersion and withdrawal of the device from the hot grease or fat, the same will be heated and will tend to cook the batter immediately the same is poured thereinto. In starting a batch of doughnuts with this device, it will be understood that the device is first heated by submerging in the cooking medium and after it has obtained the desired temperature, the cooking operation is started.

Thus it will be apparent that the present invention provides a new and novel device for cooking doughnuts in which certain recognized steps heretofore necessary in the preparation of the dough from which the doughnuts are made are eliminated, and thus the labor greatly reduced.

Having thus described the invention, what is claimed as new, and what it is desired to secure by Letters Patent of the United States, is;

1. A doughnut cooking device comprising an open top receptacle like member having a circular channel portion adapted to receive the doughnut batter and shape the same, the walls of said channel being imperforate and rounded and a relatively long operating handle projecting upwardly from said receptacle like member.

2. A doughnut cooking device comprising a receptacle like member having a circular open channel having outwardly flared side walls, the walls of said channel being imperforate and rounded, and a relatively long operating handle projecting upwardly from said receptacle like member.

In testimony whereof I affix my signature.

ARTHUR B. LEWIS. [L. S.]